(12) United States Patent
Govindarao et al.

(10) Patent No.: US 10,491,810 B2
(45) Date of Patent: Nov. 26, 2019

(54) ADAPTIVE CONTROL OF IMAGE CAPTURE PARAMETERS IN VIRTUAL REALITY CAMERAS

(71) Applicant: Nokia Technologies Oy, Espoo (FI)

(72) Inventors: Krishna Govindarao, Bangalore (IN); Mithun Uliyar, Bangalore (IN); Ravi Shenoy, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/080,140

(22) PCT Filed: Feb. 28, 2017

(86) PCT No.: PCT/IB2017/051152
§ 371 (c)(1),
(2) Date: Aug. 27, 2018

(87) PCT Pub. No.: WO2017/149441
PCT Pub. Date: Sep. 8, 2017

(65) Prior Publication Data
US 2019/0052800 A1    Feb. 14, 2019

(30) Foreign Application Priority Data
Feb. 29, 2016 (IN) .............................. 201641007009

(51) Int. Cl.
*H04N 5/232* (2006.01)
(52) U.S. Cl.
CPC ..... *H04N 5/23222* (2013.01); *H04N 5/23216* (2013.01); *H04N 5/23238* (2013.01)
(58) Field of Classification Search
CPC .... H04N 5/23222; H04N 5/247; H04N 5/232; H04N 5/23216; H04N 5/23238
See application file for complete search history.

(56) References Cited

U.S. PATENT DOCUMENTS 8,773,542 B2    7/2014  Jiang et al.
9,041,829 B2    5/2015  Venkataraman et al.
(Continued)

FOREIGN PATENT DOCUMENTS

WO    2014/022490 A1    2/2014

OTHER PUBLICATIONS

Sanokho et al., "Camera Motion Graphs", Proceedings of the ACM SIGGRAPH/Eurographics Symposium on Computer Animation, 2014, 12 pages.
(Continued)

*Primary Examiner* — Timothy J Henn
(74) *Attorney, Agent, or Firm* — Nokia Technology Oy (57) ABSTRACT

In an example embodiment, method, apparatus and computer program product are provided. The method includes accessing image capture parameters of a plurality of component cameras at a first time instant, where the image capture parameters for a respective component camera of the component cameras are determined based on a scene appearing in a field of view (FOV) of the respective component camera. At a second time instant, a change in appearance of one or more objects of the scene from a FOV of a first component camera to a FOV of a second component camera is determined. Upon determining the change of the appearance of the one or more objects at the second time instant, image capture parameters of the second component camera are set based on image capture parameters of the first component camera accessed at the first time instant.

14 Claims, 8 Drawing Sheets

(56) References Cited

U.S. PATENT DOCUMENTS

| | | | |
|---|---|---|---|
| 2001/0010542 A1* | 8/2001 | Takagi | G01S 3/7864 |
| | | | 348/152 |
| 2003/0234866 A1 | 12/2003 | Cutler | |
| 2008/0211915 A1* | 9/2008 | McCubbrey | G08B 13/19608 |
| | | | 348/159 |
| 2010/0208941 A1* | 8/2010 | Broaddus | G01S 3/7864 |
| | | | 382/103 |
| 2013/0016877 A1* | 1/2013 | Feris | G06K 9/00771 |
| | | | 382/103 |
| 2014/0098229 A1 | 4/2014 | Lu et al. | |
| 2015/0009298 A1 | 1/2015 | Thiel et al. | |
| 2015/0054913 A1 | 2/2015 | Annau et al. | |
| 2015/0116502 A1 | 4/2015 | Um et al. | |
| 2015/0145952 A1 | 5/2015 | Hirata et al. | |
| 2015/0222799 A1 | 8/2015 | Noorkami et al. | |
| 2015/0348580 A1 | 12/2015 | Van Hoff et al. | |
| 2016/0088280 A1 | 3/2016 | Sadi et al. | |
| 2017/0118400 A1 | 4/2017 | Hesch et al. | |

OTHER PUBLICATIONS

International Search Report and Written Opinion received for corresponding Patent Cooperation Treaty Application No. PCT/IB2017/051152, dated Jun. 28, 2017, 14 pages.

Lu et al., "A Novel Camera Parameters Auto-Adjusting Method Based on Image Entropy", RoboCup 2009: Robot Soccer World Cup XIII, 2010, pp. 192-203.

Diverdi et al., "Envisor: Online Environment Map Construction for Mixed Reality", IEEE Virtual Reality Conference, Mar. 8-12, 2008, pp. 19-26.

Luis Gaemperle et al., "An Immersive Telepresence System Using a Real-Time Omnidirectional Camera and a Virtual Reality", 2014 IEEE International Symposuim on Multimedia, Dec. 1, 2014, pp. 175-178.

* cited by examiner

ADAPTIVE CONTROL OF IMAGE CAPTURE PARAMETERS IN VIRTUAL REALITY CAMERAS

RELATED APPLICATION

This application was originally filed as Patent Cooperation Treaty Application No. PCT/IB2017/051152 filed Feb. 28, 2017 which claims priority benefit to IN Patent Application No. 201641007009, filed Feb. 29, 2016.

TECHNICAL FIELD

Various implementations relate generally to method, apparatus, and computer program product for adaptive camera control of virtual reality cameras.

BACKGROUND

Virtual reality (VR) cameras have multiple component cameras (for example, eight component cameras) that cover the entire three-dimensional (3D) field of view around themselves, and every component camera has its own image pipeline which processes raw images from the respective component camera to obtain a quality image. The images obtained from multiple component cameras are then 'stitched' for virtual reality consumption. The stitching is similar to panorama algorithms and is made possible, as a VR camera rig is so designed that the component cameras have overlapping field of views (FOVs).

In a scenario, where a VR camera is moving, for example worn by a hiker on a backpack or on a dolly for shooting a VR movie, the component cameras keep seeing different scenes, for example, the FOVs of the component cameras keep changing. Existing algorithms for adjusting 3A parameters (e.g., exposure, focus and white balance) of the component cameras take time to adapt and converge, similar to any conventional cameras. When one suddenly changes the FOV of a conventional camera, the color and exposure is initially 'off', and in a matter of a few seconds or within a second, it corrects itself. While the above is tolerable in conventional video, in the case of VR, when one is immersed in the content, if the image content varies as one moves his/her head, it may be very discomforting.

In an example, imagine a room with a window and the VR camera, in which a camera A may be imaging the scene near the window and outside, while an adjacent camera, say, camera B is imaging an interior part of the room. The exposures for cameras A and B will be very different, with the camera A having a very low exposure and the camera B having a moderately high exposure. If the cameras A and B move such that the part of the scene containing the window comes into the FOV of camera B, then, the video captured by the camera B will be saturated and overly bright. This is because it takes some time for the camera 3A algorithms to figure out that the scene has changed, and exposure has to be accordingly adjusted. When content like this is consumed via a VR headset in an immersive manner, this may cause discomfort and lead to a sub-par user experience.

SUMMARY OF SOME EMBODIMENTS

Various aspects of example embodiments are set out in the claims.

In a first aspect, there is provided a method comprising: accessing, at a first time instant, one or more image capture parameters of a plurality of component cameras, the one or more image capture parameters for a respective component camera of the plurality of component cameras is determined based on a scene appearing in a field of view of the respective component camera; determining, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant; and upon determining the change in the appearance of the one or more objects at the second time instant, setting one or more image capture parameters of the second component camera based on one or more image capture parameters of the first component camera accessed at the first time instant.

In a second aspect, there is provided an apparatus comprising: a virtual reality camera comprising a plurality of component cameras to capture image frames of a scene, at least one processor; and at least one memory comprising computer program code, the at least one memory and the computer program code configured to, with the at least one processor, cause the apparatus to at least perform: access, at a first time instant, one or more image capture parameters of a plurality of component cameras of a virtual reality camera, the one or more image capture parameters for a respective component camera of the plurality of component cameras determined based on a scene appearing in a field of view of the respective component camera; determine, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant; and upon determining the change in the appearance of the one or more objects at the second time instant, set one or more image capture parameters of the second component camera based on one or more image capture parameters of the first component camera accessed at the first time instant.

In a third aspect, there is provided a computer program product comprising at least one computer-readable storage medium, the computer-readable storage medium comprising a set of instructions, which, when executed by one or more processors, cause an apparatus to at least perform: access, at a first time instant, one or more image capture parameters of a plurality of component cameras, the one or more image capture parameters for a respective component camera of the plurality of component cameras is determined based on a scene appearing in a field of view of the respective component camera; determine, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant; and upon determining the change in the appearance of the one or more objects at the second time instant, set one or more image capture parameters of the second component camera based on one or more image capture parameters of the first component camera accessed at the first time instant.

In a fourth aspect, there is provided an apparatus comprising: means for accessing, at a first time instant, one or more image capture parameters of a plurality of component cameras, the one or more image capture parameters for a respective component camera of the plurality of component cameras is determined based on a scene appearing in a field of view of the respective component camera; means for determining, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant; and upon determining the change in the appearance of the one or more objects at the second time instant, means for setting one or more image capture parameters of the second component camera based on one or more image capture parameters of the first component camera accessed at the first time instant.

BRIEF DESCRIPTION OF THE FIGURES

Various embodiments are illustrated by way of example, and not by way of limitation, in the figures of the accompanying drawings in which.

DETAILED DESCRIPTION

Example embodiments and their potential effects are understood by referring to FIGS. 1 through 6 of the drawings.

Figure 1:
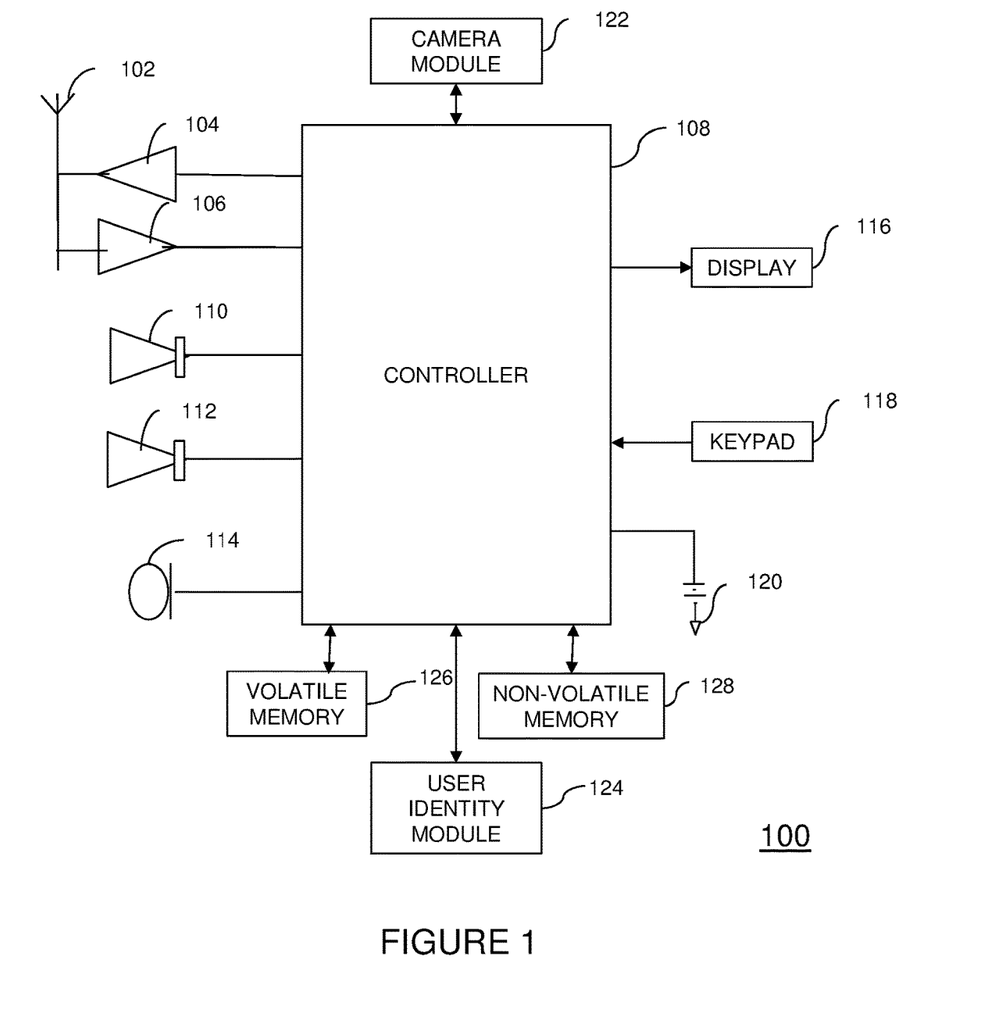
FIG. 1 illustrates a device, in accordance with an example embodiment.

FIG. 1 illustrates a device 100, in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of touch screen based mobile electronic devices, for example, portable digital assistants (PDAs), mobile televisions, gaming devices, cellular phones, all types of computers (for example, laptops, mobile computers or desktops), cameras including virtual reality cameras, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing devices that provides signals to and receives signals from the transmitter 104 and the receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols such as IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional web browser. The connectivity program may then allow the device 100 to transmit and receive web content, such as location-based content and/or other web page content, according to a Wireless Application Protocol (WAP), Hypertext Transfer Protocol (HTTP) and/ or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input devices. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or a decoder for compressing and/or decompressing image data. The encoder and/or decoder may encode and/or decode according to a JPEG standard format or another like format. For video, the encoder and/or the decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include a volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
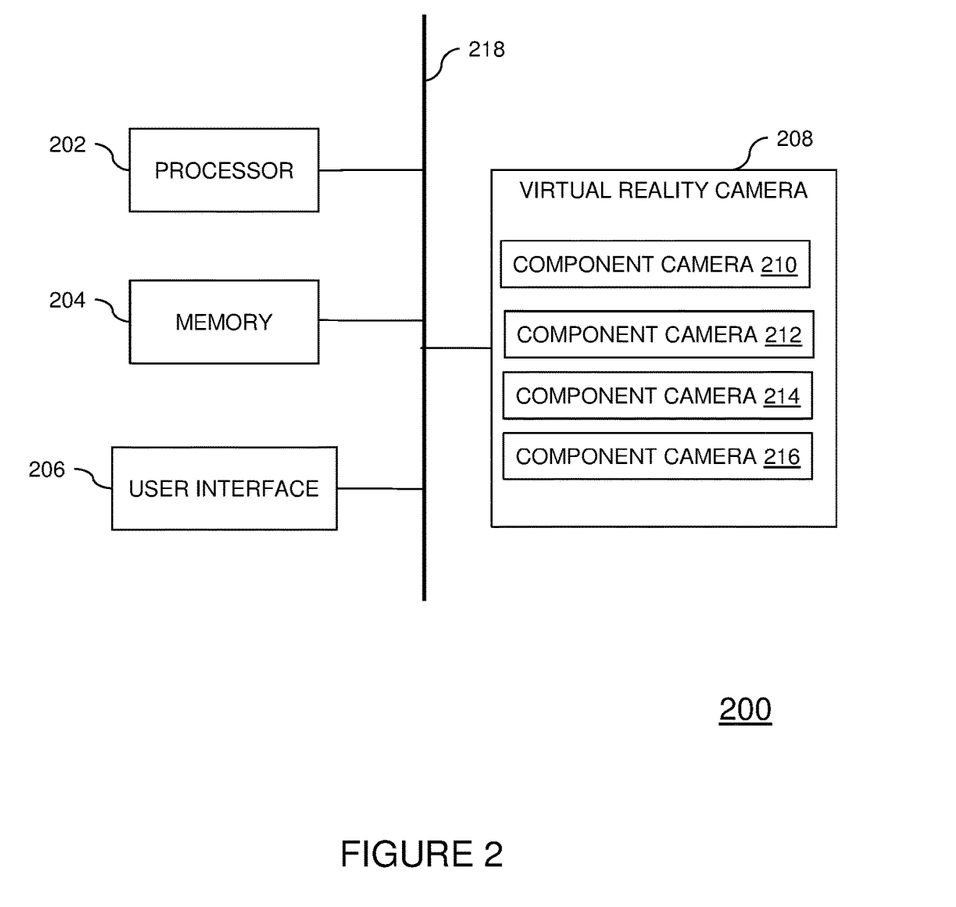
FIG. 2 illustrates an apparatus for adaptive control of image capture parameters in a virtual reality camera, in accordance with an example embodiment.

FIG. 2 illustrates an apparatus 200 for adaptive camera control of virtual reality cameras, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. In an example embodiment, the apparatus 200 may be a virtual reality camera or may be a virtual reality camera that includes multiple component cameras for capturing 360 degree view of a scene. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

Herein, the term 'virtual reality camera' refers to any camera system that comprises a plurality of components cameras configured with respect to each other such that the plurality of component cameras are used to capture 360 degree views of the surrounding. Hence, references to the term 'virtual reality camera' throughout the description should be construed as any camera system that has multiple cameras for capturing a 360 degree view of the surrounding. The plurality of component cameras may have overlapping field of views, such that the images (or image frames) captured by the plurality of component cameras may be stitched to generate a 360 degree view of the surrounding. Examples of the virtual reality cameras may include a camera system comprising multiple component cameras that can be worn by a hiker on a backpack or on a dolly for shooting a VR movie, or mounted on a mobile van, or may be configured in form of other wearable devices. Additional examples of the virtual reality cameras may include surveillance cameras that may be fixed to stationary objects, or may be positioned in indoor spaces such as shopping malls, convention centers, etc.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, an input interface and/or an output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include a virtual reality camera or a surveillance camera with or without communication capabilities, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus 200 or circuitry to perform the functions of the transceiver. The transceiver may be configured to receive media content. Examples of the media content may include audio content, video content, data, and a combination thereof.

In an example embodiment, the electronic device may be embodied as to include a virtual reality (VR) camera 208. In an example embodiment, the VR camera 208 include multiple component cameras (e.g., component cameras 210, 212, 214 and 216) that are positioned with respect to each other such that they have overlapping field of views and a 360 degree 3-D view of the scene surrounding the VR camera 208 can be obtained by based on the images/image frames captured individually by the component cameras 210, 212, 214 and 216 of the VR camera 208. Only four component cameras 210, 212, 214 and 216 are shown for example purposes to facilitate present description, and it should be understood that there may be more than four component cameras present in the VR camera 208. The VR camera 208 may be in communication with the processor 202 and/or other components of the apparatus 200. The VR camera 208 may be in communication with other imaging circuitries and/or software, and is configured to capture digital images or to capture video or other graphic media. In an example embodiment, the VR camera 208 may be an array camera or a plenoptic camera capable of capturing light-field images (having multiple views of the same scene) and various views of images of the scene can be generated from such captured images. The VR camera 208, and other circuitries, in combination, may be examples of at least one component camera such as the camera module 122 of the device 100.

These components (202-208) may communicate to each other via a centralized circuit system 218 to facilitate adaptive control of image capture parameters of the component cameras for example, the component cameras 210, 212, 214 and 216 of the VR camera 208. The centralized circuit system 218 may be various devices configured to, among other things, provide or enable communication between the components (202-208) of the apparatus 200. In certain embodiments, the centralized circuit system 218 may be a central printed circuit board (PCB) such as a motherboard, a main board, a system board, or a logic board. The centralized circuit system 218 may also, or alternatively, include other printed circuit assemblies (PCAs) or communication channel media.

In an example embodiment, the processor 202 is configured to, with the content of the memory 204, and optionally with other components described herein, to cause the apparatus 200 to access one or more image capture parameters for each of the component cameras 210, 212, 214 and 216 of the VR camera 208. In an example embodiment, the one or more image acquisition parameters include 3A parameters, for example, exposure, focus and white balance. In an example embodiment, a processing means may be configured to access the one or more image parameters. A non-limiting example of the processing means may include the processor 202, which may be an example of the controller 108, and the memory 204.

For example, at a first time instant (e.g., time 't1'), one or more image capture parameters (P1(t1), P2(t1), P3(t1)) for each of a plurality of component cameras (C1, C2, C3 and C4) of a VR camera (such as the component cameras 210, 212, 214 and 216 of the VR camera 208) are accessed. Without loss of generality, in an example, the image capture parameters (P1(t1), P2(t1), P3(t1)), may represent exposure setting, focus setting and white balance setting, respectively for any component camera at the time instant 't1'. In an example embodiment, the values of the image capture parameters, for example, the P1(t1) are set as per the field of view (the scene before the component camera that can be imaged by the component camera) of the camera component. For example, a component camera imaging a bright part of the scene will be using a lower exposure compared to another component camera imaging a darker part of the scene. For instance, in an example it is assumed that at the time 't1', the component camera C1 is imaging the scene near the window from which the outside Sun is visible, while an adjacent component camera, say, the component camera C2 is imaging an interior part of the room. In this example, the exposures for the component cameras C1 and C2 will be very different, with C1 having a very low exposure and C2 having a moderately high exposure. If the 't1' is considered as a time instant when the VR camera (a combination of the component cameras C1, C2, C3 and C4) is initialized to take images/image frames of a scene; within a few frames from the time 't1', the component cameras C1, C2, C3 and C4 converge to their optimal settings for the image capture parameters. For example, exposures of all component cameras C1, C2, C3 and C4 are set.

In an example embodiment, the values of the image capture parameters (P1(t1), P2(t1), P3(t1)) are accessed for each of the component cameras (C1, C2, C3 and C4), and as these values are computed as optimal values based on the content of the scene, these values are stored. For instance, (P1(c1,t1), P2(c1,t1), P3(c1,t1)) are the parameters for the component camera C1 at the time instant 't1'; (P1(c2,t1), P2(c2,t1), P3(c2,t1)) are the parameters for the component camera C2 at the time instant 't1', and the (P1(c3,t1), P2(c3,t1), P3(c3,t1)) are the parameters for the component camera C3 at the time instant 't1'.

In an example embodiment, the apparatus 200 is caused to determine at a second time instant (e.g., time 't2'), if there is a change in appearance of one or more objects from field of views of one component camera to another component camera of the plurality of component cameras due to a relative movement between the virtual reality (VR) camera and the one or more objects of the scene. For instance, one or more objects that appear in the field of view of a first camera at the first time instant (time 't1') may appear in the field of view (FOV) of a second camera at the second time instant (time 't2') due to a relative movement between the VR camera and the one or more objects of the scene or due to a relative movement between the VR camera and the entire scene. In an example, consider an object O1 appears in the FOV of the first component camera (e.g., camera C2) at the time 't1'; and at the time 't2', due to a relative movement between the VR camera and scene, the object O1 now appears in the FOV of the second component camera (e.g., camera C3). Similarly, in an example, consider an object O2 appears in the FOV of the first component camera (e.g., camera C3) at the time 't1'; and at the time 't2', due to a relative movement between the VR camera and scene, the object O2 now appears in the FOV of the second component camera (e.g., camera C1).

Herein, it should be understood that the terms 'first component camera' and the 'second component camera' are used merely to distinguish between two separate component cameras of the plurality of component cameras present in the VR camera, and that the 'first component camera' refer to a component camera from the FOV of which the one or more objects move and appear in the FOV of another component camera referred to as the 'second component camera'. It should further be noted that the 'relative movement' between the VR camera and the one or more objects of the scene or the entire scene may happen either because of movement of the VR camera, movement of the person/object carrying the VR camera, movement of the entire scene, movement of the one or more objects in the scene, or one or more combinations of these movements. The movement of the objects may be determined based on tracking the objects using suitable object detection and tracking algorithms. Further, the movement of the VR camera is tracked based on an accelerometer reading associated with the VR camera. For instance, the VR camera may include components such as an accelerometer, a gyroscope, etc to continuously compute the degree of rotations, or changes in the orientation of the VR camera between any two time instants.

Upon determination of the change in the appearance of the at least one object at the second time instant (t2), in an example embodiment, the apparatus 200 is caused to set one or more image capture parameters of the second component camera based on the one or more image capture parameters of the first component camera that are already accessed at the first time instant (t1). For example, if a change in appearance of the object O1 from the FOV of the first component camera (e.g., component camera C2) at the time 't1' to the FOV of the second component camera (e.g., component camera C3) at the time 't2' is determined, the one or more image capture parameters of the component camera C3 are set same as the one or more image capture parameters of the component camera C2 at the time 't1'. For instance, in a representation, (P1(c1,t2), P2(c1,t2), P3(c1,t2)) are the image capture parameters for the component camera C1 at the time instant 't2'; (P1(c2,t2), P2(c2,t2), P3(c2,t2) are the parameters for the component camera C2 at the time instant 't2', and the (P1(c3,t2), P2(c3,t2), P3(c3,t2)) are the parameters for the component camera C3 at the time instant 't2'. In this example, the values of (P1(c3,t2), P2(c3,t2), P3(c3,t2) may be same as the respective values of image capture parameters of the component camera C1 at time 't1', for example, (P1(c1,t1), P2(c1,t1), P3(c1,t1)). In an example embodiment, a processing means may be configured to set the one or more image parameters for the second component camera. A non-limiting example of the processing means may include the processor 202, which may be an example of the controller 108.

Figure 3A:
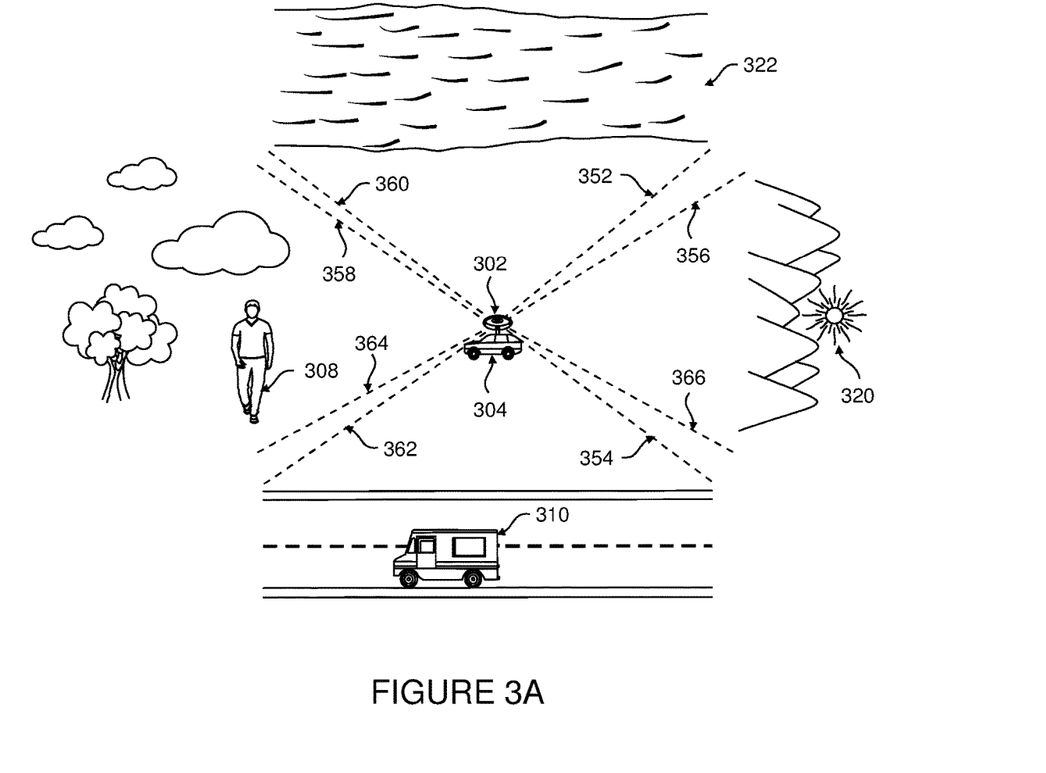
FIG. 3A illustrates an example representation of an image capturing of a scene by a virtual reality camera at a first time instant, in accordance with an example embodiment.
Figure 3B:
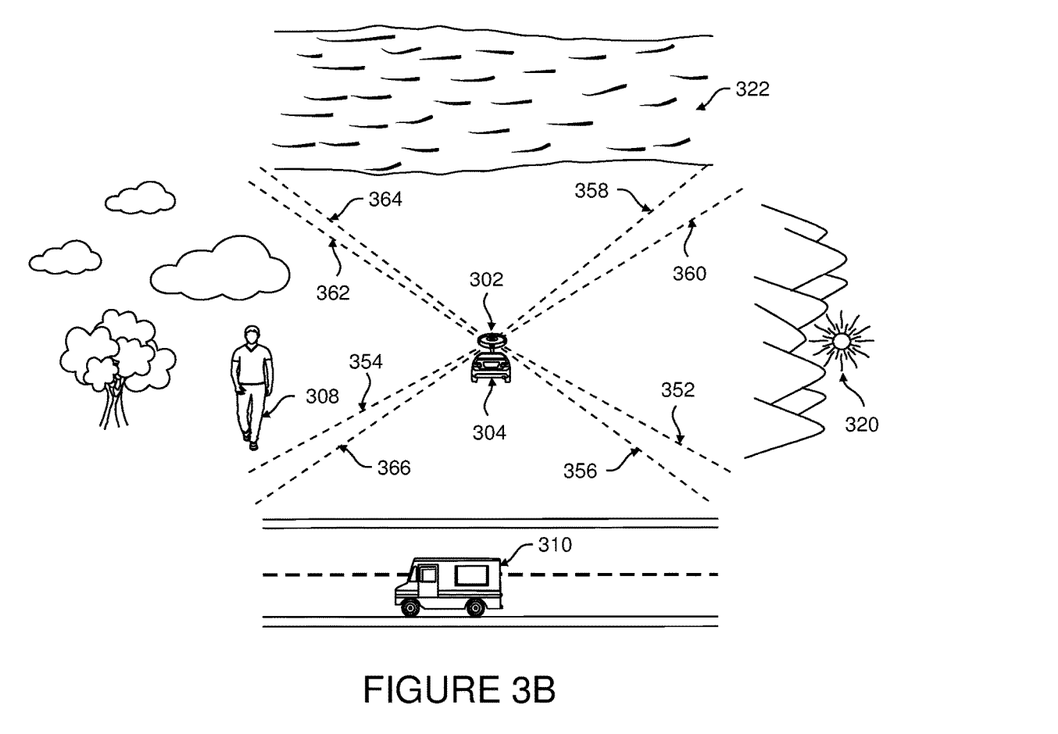
FIG. 3B illustrates an example representation of an image capturing of the scene by the virtual reality camera at a second time instant, in accordance with an example embodiment.

FIGS. 3A and 3B represent schematic representation of a VR camera 302 for capturing images of a scene for facilitating description of an example embodiment. In FIG. 3A, a position of the VR camera 302 at the time instant 't1' is shown. It is to be understood that a relative movement between the VR camera 302 and the scene (or one more objects of the scene) may be caused either by a movement of a vehicle 304 on which the VR camera 302 is mounted or the rotation of the VR camera 302 around one of its axis vertical to the vehicle 304, or movement of the one or more objects of the scene, for example, movement of a person 308 or a vehicle 310 or any other movable objects in the scene.

In this example representation of FIG. 3A, without loss of generality, the VR camera 302 includes component cameras C1, C2, C2 and C4. At time instant 't1', scene containing Sun 320 appears in the FOV of the component camera C1, a scene containing water body 322 appears in the FOV of the component camera C2, a scene containing the person 308 appears in the FOV of the component camera C3 and a scene containing the vehicle 310 appears in the FOV of the component camera C4. The FOV of the component camera C1 is exemplarily shown within two dashed lines 352 and 354, FOV of the component camera C2 is exemplarily shown within two dashed lines 356 and 358, FOV of the component camera C3 is exemplarily shown within two dashed lines 360 and 362, and FOV of the component camera C4 is exemplarily shown within two dashed lines 364 and 366. It should be noted that the component cameras C1-C4 may have overlapping FOVs, for example, the area shown between the dashed lines 352 and 356 represents an overlapping FOV between the component cameras C1 and C2, and similarly the area shown between the dashed lines 358 and 360 represents an overlapping FOV between the component cameras C1 and C3. In an example embodiment, the component cameras C1, C2, C3 and C4 adjust to image capture parameters (exposure, focus and white balance) within few frames from the time when the VR camera 302 is initialized, based on the content the scene. The following Table 1 lists down the image capture parameter values (optimal values) for the component cameras C1, C2, C3 and C4 at the time instant t1.

TABLE 1

| | Component Camera C1 | Component Camera C2 | Component Camera C3 | Component Camera C4 |
|---|---|---|---|---|
| Scene | Sun 320 | Water body 322 | Person 308 | Vehicle 310 |
| Exposure | 2 ms | 10 ms | 12 ms | 8 ms |
| Focus | Infinity | Infinity | 3 m | 10 m |
| White Balance (Color Temperature) | 5000k | 6500k | 5000k | 5500k |

In one scenario, it may be assumed that the vehicle 304 moves such that the orientation of the VR camera 302 changes at the time instant 't2' with respect to the orientation of the VR camera 302 at the time instant 't1'. For instance, as shown in the example representation of FIG. 3B, at time instant 't2', scene containing the Sun 320 appears in the FOV of the component camera C2, scene containing the water body 322 appears in the FOV of the component camera C3, scene containing the person 308 appears in the FOV of the component camera C4 and scene containing the vehicle 310 appears in the FOV of the component camera C1.

In various example embodiments, the apparatus 200 is caused to set the image capture parameters at the time instant 't2' based on the previous settings instead of re-calculating the settings for the image capture parameters. For instance, the Sun 320 appeared in the FOV of the component camera C1 at the time instant 't1' and due to relative movement between the VR camera 302 and the scene, the Sun 320 appears in the FOV of the component camera C2 at the time instant 't2'. Hence, the image capture parameters for the component camera C2 at the time instant 't2' can be taken directly from the corresponding values of the image capture parameters for the component camera C1 at the time instant 't1'. In an example embodiment, in the present example scenario explained herein, the updated values of the image capture parameters for the component cameras C1, C2, C3 and C4 at the time instant 't2' are listed in the following Table 2.

TABLE 2

| | Component Camera C1 | Component Camera C2 | Component Camera C3 | Component Camera C4 |
|---|---|---|---|---|
| Scene | Vehicle 310 | Sun 320 | Water body 322 | Person 308 |
| Exposure | 8 ms | 2 ms | 10 ms | 12 ms |
| Focus | 10 m | Infinity | Infinity | 3 m |
| White Balance (Color Temperature) | 5500k | 5000k | 6500k | 5000k |

Figure 4A:
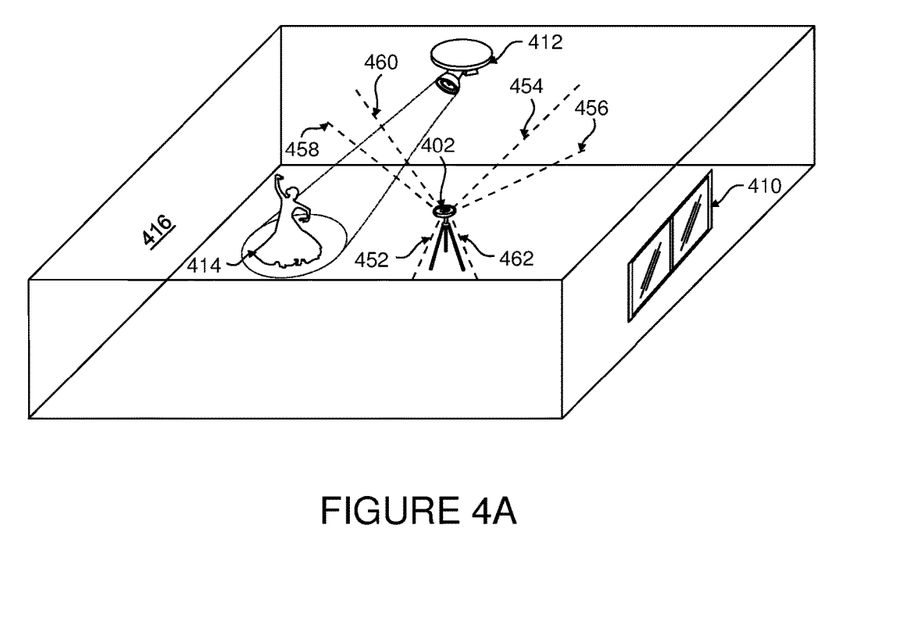
FIG. 4A illustrates another example representation of an image capturing of a scene by a virtual reality camera at a first time instant, in accordance with an example embodiment.
Figure 4B:
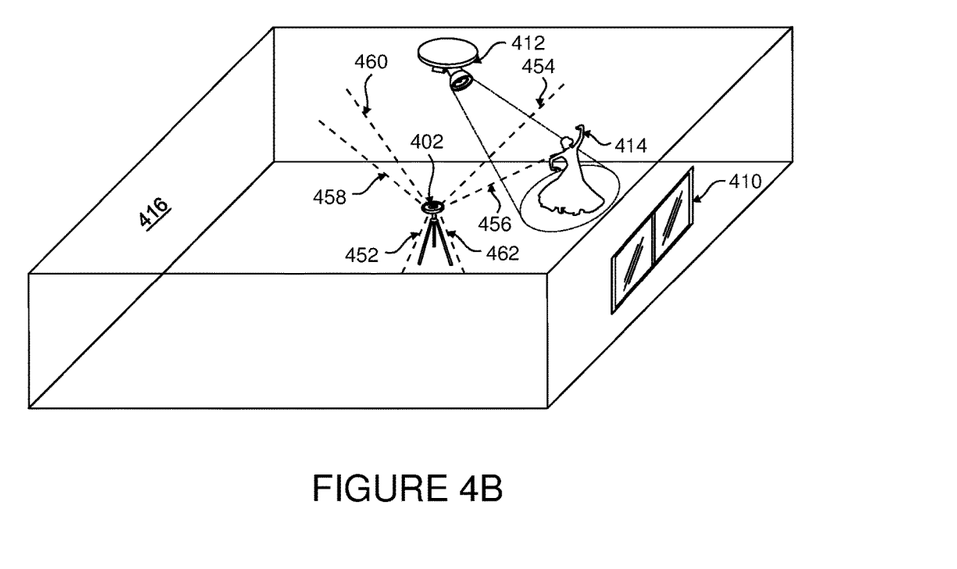
FIG. 4B illustrates another example representation of an image capturing of the scene by the virtual reality camera at a second time instant, in accordance with an example embodiment.

FIGS. 4A and 4B represent another schematic representation of a VR camera for capturing images of a scene for facilitating description of an example embodiment. The representation of the scene in FIG. 4A is at a time instant 't1' and a representation of the scene in FIG. 4B is at a time instant 't2', where the time instant 't2' is subsequent to the time instant 't1'. A VR camera 402 is shown in FIGS. 4A and 4B comprising component cameras C1, C2 and C3. The scene comprises a room comprising an exterior window 410 having glass panels, a spotlight 412 and a performer (e.g., dancer) 414 near a wall 416.

As shown in FIG. 4A, at the time instant 't1', the exterior window 410 having outside view of daylight appears in the FOV of the component camera C1, the spotlight 412 appears in the FOV of the component camera C2 and the performer 414 (near the wall 416) appears in the FOV of the component camera C3. The FOV of the component camera C1 is exemplarily shown within two dashed lines 452 and 454, FOV of the component camera C2 is exemplarily shown within two dashed lines 456 and 458, and FOV of the component camera 408 is exemplarily shown within two dashed lines 460 and 462. In a scenario, the time instant 't1' being considered a time when the VR camera 402 is initialized, the image capture parameters of the component cameras C1, C2 and C3 are set by the processor 202 based on the content of the scene to be captured by the component cameras C1, C2 and C3 (e.g., objects present in the FOVs of the component cameras C1, C2 and C3). Example values of some example image capture parameters set for the component cameras C1, C2 and C3 are listed in the following Table 3. It is to be understood that the image capture parameters in the Table 3 are merely for illustrative purposes, and corresponding values are not intended to be accurate.

TABLE 3

| | Component Camera C1 | Component Camera C2 | Component Camera C3 |
|---|---|---|---|
| Scene | Window 410 | Spotlight 412 | Performer 414 |
| Exposure | 10 ms | 2 ms | 8 ms |
| Focus | Infinity | 4 m | 2 m |
| White Balance (Color Temperature) | 5500k | 4000k | 4500k |

In a scenario, it is assumed that the performer 414 moves such that the performer 414 appears in the FOV of the component camera C1 at the time instant 't2' instead of in the FOV of the component camera C3. Accordingly, in this example scenario, both the objects such as the window 410 and the performer 414 appear in the FOV of the component camera C1 and only the wall 416 appears in the FOV of the component camera C3. In this example scenario, if the performer 414 is considered as the object of interest, the settings of the image capture parameters of the component camera C3 at the time instant 't1' are transferred as the settings of the image capture parameters of the component camera C1 at the time instant 't2', and image capture parameters for other component cameras C2 and C3 may remain unchanged. In this example scenario explained herein, the updated values of the image capture parameters for the component cameras C1, C2 and C3 at the time instant 't2' are listed in the following Table 4.

TABLE 4

| | Component camera C1 | Component Camera C2 | Component Camera C3 |
|---|---|---|---|
| Scene | Window 410, Performer 414 | Spotlight 412 | Wall 416 |
| Exposure | 8 ms | 2 ms | 8 ms |
| Focus | 2 m | 4 m | 2 m |
| White Balance (Color Temperature) | 4500k | 4000k | 4500k |

Accordingly, it is noted that the objects are tracked across the FOVs of the components cameras C1, C2 and C3 so that the image capture parameters (3A parameters) can be intelligently transferred, so that the end user perceives even tone throughout the imaging process by the component cameras C1, C2 and C3 of the VR camera 402.

It is further noted that in some scenarios, it may happen that views of the scene for a component camera may change significantly, and the same views may not have been imaged previously. In an example embodiment, in such scenarios, the one or more image capture parameters may be computed as per the actual content of the scene appearing in the FOV of the component camera. Further, in some scenarios, it may happen that some object that was at a distance from the component camera now moves close to the component camera, thus drastically changing what the component camera sees. The apparatus 200 is caused to determine such scenarios by tracking of objects, and the apparatus 200 is caused to determine new image capture parameters (e.g., new 3A parameters). In an example embodiment, local motion of objects/entities in the scene for each component camera can be tracked to see if the objects/entities are moving towards the component camera. Upon occurrence of such scenario, in an example embodiment, the 3A parameters can be computed and tracked on the entities/objects, which means, even as the objects/entities nears the camera, the component camera keeps adapting gradually. In an example, if the component camera is using a matrix metering mode, with different regions having different weights, it could adapt the weights such that the entities/objects moving towards the camera get the highest weight, so that the entities/objects are rendered well in terms of lightness and color. Alternately, upon sensing that an object/entity is moving towards the camera, spot metering could be used on the entity/object.

Figure 5:
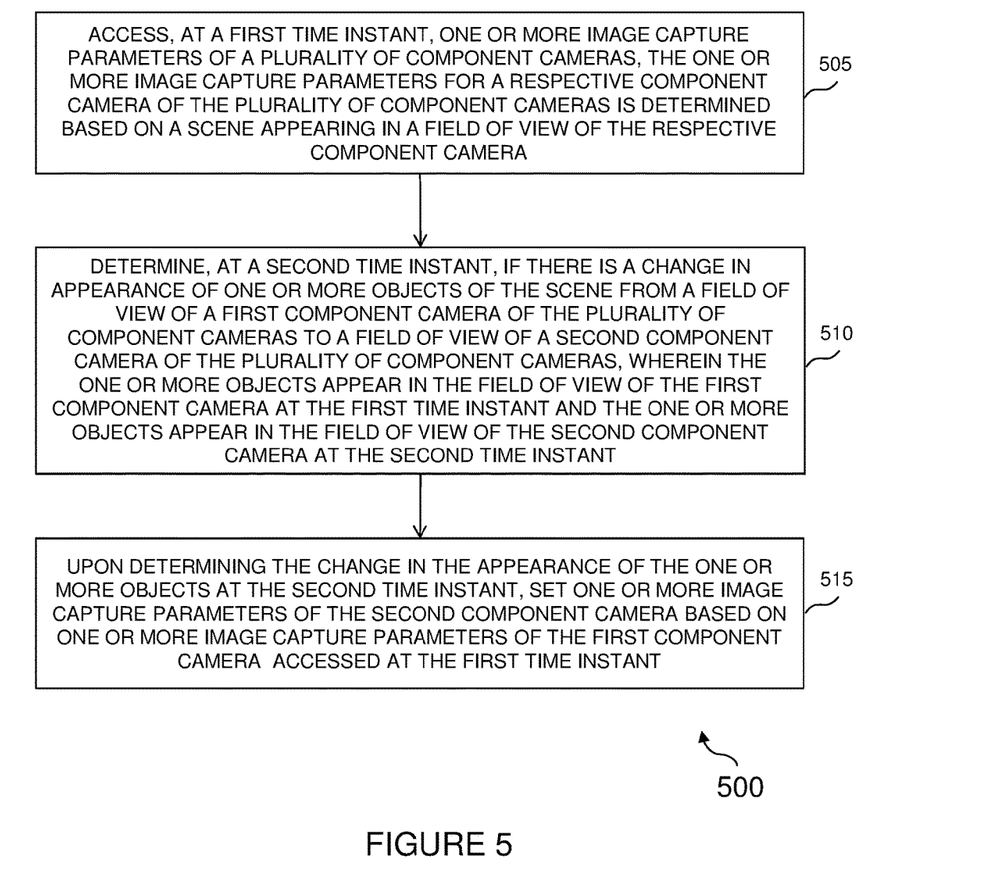
FIG. 5 is a flowchart depicting an example method for adaptive control of image capture parameters in a virtual reality camera, in accordance with an example embodiment.

FIG. 5 is a flowchart depicting an example method 500 for adaptive control of image capture parameters in a virtual reality camera in accordance with an example embodiment. The method 500 depicted in the flowchart may be executed by, for example, the apparatus 200 of FIG. 2.

At 505, the method 500 includes accessing, at a first time instant, one or more image capture parameters of a plurality of component cameras of a virtual reality camera. More specifically, the one or more image capture parameters for a respective component camera of the plurality of component cameras are determined based on a scene appearing in a field of view of the respective component camera. In an example embodiment, the one or more image capture parameters are associated with acquisition of views (or images) of a scene. Some non-limiting examples of the image capture parameters include exposure, focus and white balance. In an example embodiment, the image capture parameters accessed at the first time instant are optimal image capture parameters that are set based on the content of the scene that appear in the FOV of the component cameras.

At 510, the method 500 includes determining, at a second time instant, if there is a change in appearance of one or more objects of the scene from a field of view of a first component camera of the plurality of component cameras to a FOV of a second component camera of the plurality of component cameras. It is to be noted that the one or more objects appear in the FOV of the first component camera at the first time instant and the one or more objects appear in the FOV of the second component camera at the second time instant.

At 515, the method 500, upon determining the change in the appearance of the one or more objects at the second time instant, set one or more image capture parameters of the second component camera based on one or more image capture parameters of the first component camera that are already accessed at the first time instant.

Figure 6:
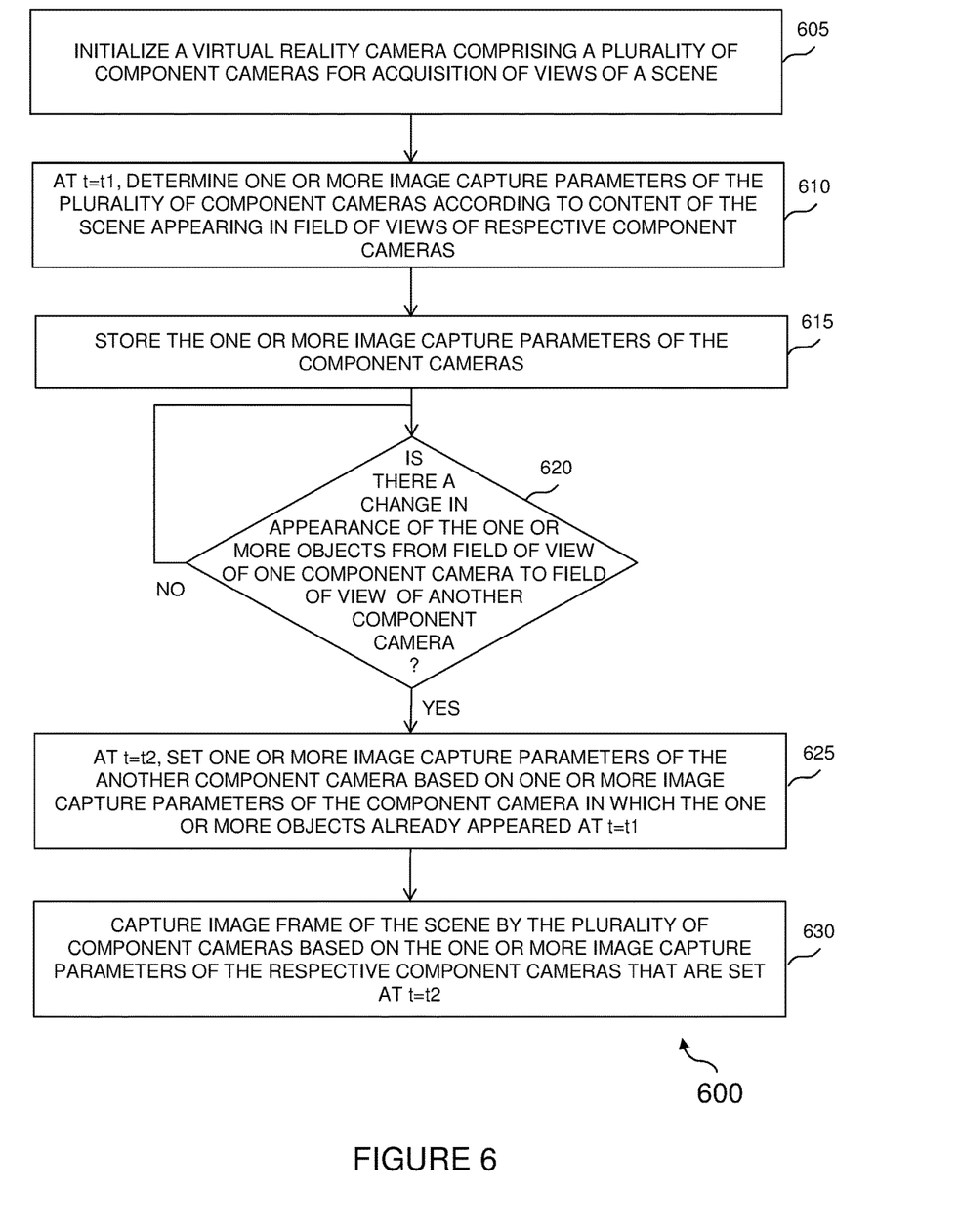
FIG. 6 is a flowchart depicting an example method for adaptive control of image capture parameters in a virtual reality camera, in accordance with another example embodiment.

FIG. 6 is a flowchart depicting an example method for adaptive control of image capture parameters, in accordance with another example embodiment. The method 600 depicted in the flowchart may be executed by, for example, the apparatus 200 of FIG. 2.

At 605, the VR camera is initialized to take images (or views) of the scene, and the each of the component camera of the VR camera is ready to capture image frames. At 610, it may be assumed that at time t='t1' (i.e., first time instant), the image capture parameters of the component cameras are determined (or adjusted/set) according to content of the scene appearing in the FOV of the respective component cameras. For example, if in an FOV of a component camera, a bright scene or bright objects appear, then the exposure value for the component camera can be adjusted to a smaller value, and if in an FOV of a component camera, a slightly darker scene or not so bright objects appear, then the exposure value for such component can be a slightly higher value. The image capture parameters are set by a processing element, for example, the processor 202. At 615, the one or more image capture parameters of the plurality of component cameras are stored in a memory location or buffer, for example, the memory 204.

At 620, it is determined if there is a change in appearance of the one or more objects from FOV of one component camera (e.g., first component camera) to FOV of another component camera (e.g., second component camera). It is noted that the change in appearance of the one or more objects from FOV of one camera to another camera over time may occur due to a relative movement between the VR camera and the one or more objects of the scene, or movement of entire scene with respect to the VR camera.

At 625, at time t='t2', upon determination of the changes in appearance of the one or more objects, the one or more image capture parameters of the another component camera (second component camera) based on the one or more image capture parameters of the component camera (first component camera) in which the one or more objects already appeared at the time t='t1'. At 630, the image frame of the scene is captured by the plurality of component cameras based on the image capture parameters of the respective component cameras set at the time t='t2'. It is noted that in an example embodiment, changes in appearance of objects from FOV of one component camera to another component camera are determined on a continuous basis, and upon determination the already computed values of the image parameters of the component camera are used, to preclude re-computation of the image capture parameters for the component camera in which the objects appear.

It should be noted that to facilitate discussions of the flowcharts of FIGS. 5 and 6, certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 500 and 600 are performed in an automated fashion. These operations involve substantially no interaction with the user. Other operations of the methods 500 and 600 may be performed by in a manual fashion or semi-automatic fashion. These operations involve interaction with the user via one or more user interface presentations.

The methods depicted in these flowcharts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve adaptive control of image capture parameters of component cameras in a virtual reality camera. Various example embodiments make use for the already computed values of the image capture parameters for the component cameras for adaptively setting the image capture parameters for the component cameras over time based on the changes in the scene or changes in the orientation or positioning of the virtual camera. Hence, instead of re-computing the image capture parameters all the time, various embodiments described herein transfer the image capture parameters from one component camera to another component, following objects or regions of interest across the FOV of the component cameras, as the component cameras or the scene moves.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising:
   accessing, at a first time instant, one or more image capture parameters of a plurality of component cameras, wherein one or more image capture parameters for a respective component camera of the plurality of component cameras are determined based on a scene appearing in a field of view of the respective component camera, wherein a virtual reality camera comprises the plurality of camera components;
   determining, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant, wherein the change in appearance of the one or more object is due to a relative movement between the virtual reality camera and the one or more objects of the scene; and
   upon determining the change in the appearance of the one or more objects at the second time instant, setting one or more image capture parameters of the second component camera based on one or more image capture parameters of the first component camera accessed at the first time instant.

2. The method as claimed in claim 1, further comprising capturing, at the second time instant, an image frame of the scene by the second component camera based on the one or more image capture parameters that are set for the second component camera at the second time instant.

3. The method as claimed in claim 2, wherein the determining the change in appearance of the one or more objects at the second time instant comprises tracking the one or more objects.

4. The method as claimed in claim 1, wherein the determining the change in appearance of the one or more objects at the second time instant comprises tracking a movement of the virtual reality camera comprising the plurality of component cameras.

5. The method as claimed in claim 1, wherein setting the one or more image capture parameters for the second component camera further comprises computing the one or more image capture parameters for the second component camera if the one or more objects appearing in the field of view of the second component camera at the second time instant did not appear in each of the plurality of component cameras at the first time instant.

6. The method as claimed in claim 1, further comprising configuring the plurality of component cameras as the virtual reality camera to capture a 360 degree view of the scene.

7. The method as claimed in claim 1, wherein the one or more image capture parameters comprise one or more of a white balance, a focus, or an exposure.

8. An apparatus comprising:
   at least one processor; and
   at least one memory comprising computer program code, the at least one memory and the computer program code configured to, with the at least one processor, cause the apparatus to at least perform:
     access, at a first time instant, one or more image capture parameters of the plurality of component cameras, wherein one or more image capture parameters for a respective component camera of the plurality of component cameras are determined based on a scene appearing in a field of view of the respective component camera, wherein a virtual reality camera comprises the plurality of camera components;
     determine, at a second time instant, if there is a change in appearance of one or more objects of the scene from a field of view of a first component camera of the plurality of component cameras to a field of view of a second component camera of the plurality of component cameras, wherein the one or more objects appear in the field of view of the first component camera at the first time instant and the one or more objects appear in the field of view of the second component camera at the second time instant, wherein the change in appearance of the one or more object is due to a relative movement between the virtual reality camera and the one or more objects of the scene; and
     upon determining the change in the appearance of the one or more objects at the second time instant, set one or more image capture parameters of the second component camera based on one or more image capture parameters of the first component camera that are accessed at the first time instant.

9. The apparatus as claimed in claim 8, wherein the apparatus is further caused, at least in part to facilitate capturing, at the second time instant, an image frame of the scene by the second component camera based on the one or more image capture parameters that are set for the second component cameras at the second time instant.

10. The apparatus as claimed in claim 9, wherein for determining the change in appearance of the one or more objects at the second time instant, the apparatus is further caused, at least in part to track the one or more objects.

11. The apparatus as claimed in claim 8, wherein for determining the change in appearance of the one or more objects at the second time instant, the apparatus is further caused, at least in part to, track a movement of the virtual reality camera.

12. The apparatus as claimed in claim 8, wherein for setting the one or more image capture parameters for the second component camera, the apparatus is further caused, at least in part to compute the one or more image capture parameters for the second component camera if the one or more objects appearing in the field of view of the second component camera at the second time instant did not appear in each of the plurality of component cameras at the first time instant.

13. The apparatus as claimed in claim 8, wherein the plurality of component cameras are configured in the virtual reality camera such that the plurality of component cameras capture a 360 degree view of the scene.

14. The apparatus as claimed in claim 8, wherein the one or more image capture parameters comprise one or more of a white balance, a focus, or an exposure.

\* \* \* \* \*